US005122968A

United States Patent [19]

Bauer et al.

[11] Patent Number: 5,122,968

[45] Date of Patent: Jun. 16, 1992

[54] APPARATUS AND METHOD FOR DRIVING AND CONTROLLING ELECTRIC CONSUMERS, IN PARTICULAR HEAT PLUGS

[75] Inventors: Hans-Peter Bauer, Ditzingen-Heimerdingen; Wolf Wessel, Oberriexingen, both of Fed. Rep. of Germany

[73] Assignee: Robert Bosch GmbH, Stuttgart, Fed. Rep. of Germany

[21] Appl. No.: 455,424

[22] PCT Filed: May 19, 1988

[86] PCT No.: PCT/DE88/00294

§ 371 Date: Dec. 26, 1989

§ 102(e) Date: Dec. 26, 1989

[87] PCT Pub. No.: WO88/10367

PCT Pub. Date: Dec. 29, 1988

[30] Foreign Application Priority Data

Jun. 23, 1987 [DE] Fed. Rep. of Germany ....... 3720683

[51] Int. Cl.[5] ............................................ G06F 15/20

[52] U.S. Cl. .................................. 364/483; 324/537; 364/480; 364/431.10

[58] Field of Search ............................... 364/480-483, 364/550, 431.1, 431.11, 571.01; 324/378, 393, 399, 500, 502, 537, 549; 371/14, 15.1; 123/478

[56] References Cited

U.S. PATENT DOCUMENTS 4,088,109 5/1978 Woodruff et al. ............... 364/431.1
4,500,775 2/1985 Sangu et al. ....................... 324/537
4,519,075 5/1985 Kawaguchi ........................ 371/15.1
4,639,871 1/1987 Sakai et al. ....................... 364/431.1
4,716,520 12/1987 Locke, Jr. et al. ............... 371/15.1
4,862,370 8/1989 Arnold et al. .................... 364/431.1

FOREIGN PATENT DOCUMENTS 2024940 1/1980 United Kingdom .

OTHER PUBLICATIONS

Abstract of Japanese patent 59-96486.
Engineer's Notebook II by F. M. Mims III, p. 28, "Serial In/Out, Parallel Out Shift Register", 1982.

*Primary Examiner*—Kevin J. Teska
*Attorney, Agent, or Firm*—Walter Ottesen

[57] ABSTRACT

An apparatus for driving and controlling electrical loads, in particular glow plugs, is proposed which includes semiconductor switches which are assigned to the glow plugs and can be driven by a microprocessor, and also includes at least one measuring resistor and is characterized in that the microprocessor (17) is so designed that the glow plugs (RK) are switched on and/or off sequentially with time displacement for such a short time that a virtually continuous current rise or decrease is produced and/or in that, in order to detect an open circuit or a short circuit in any of the glow plugs (RK), the glow plugs (RK) are driven sequentially at any desired time interval for a very short time, preferably for 1 ms and the current flowing through the glow plugs (RK) is measured with the aid of the measuring resistor (R) and/or in that one or more glow plugs (RK) are driven simultaneously if a high-energy overvoltage occurs in the voltage supply of this apparatus.

11 Claims, 5 Drawing Sheets

APPARATUS AND METHOD FOR DRIVING AND CONTROLLING ELECTRIC CONSUMERS, IN PARTICULAR HEAT PLUGS

BACKGROUND OF THE INVENTION

The invention is based on an apparatus for driving and controlling electrical loads, in particular glow plugs. In a known apparatus of this type, glow plugs of an internal combustion engine of a motor vehicle are driven sequentially with a phase displacement. However, this type of driving has the disadvantage that each time a glow plug is switched on, the current rise can substantially decay before the next plug is switched on. With short pulse lengths, it is also possible that a plug is already switched off again before the next plug is switched on. This produces high-frequency interference in the vehicle supply system.

SUMMARY OF THE INVENTION

The apparatus according to the invention for driving and controlling electrical loads and the method for driving and monitoring electrical loads by means of the apparatus have, on the other hand, the advantage that negative effects on the voltage supply, when the electrical loads or glow plugs are driven, are avoided by sequentially switching the loads on and/or off at short time displacements so that a virtually continuous current rise or fall is produced. A particular advantage is that the electrical loads or glow plugs are tested for open circuit or short circuit by driving them in sequence at any desired time interval with measurement pulses of preferably 1 ms duration and determining the current flowing through the glow plugs with the aid of the measuring resistor. It is particularly advantageous that high-energy interference voltages of the voltage supply or of the vehicle supply system are reduced by driving one or more glow plugs simultaneously for a certain time.

It is particularly advantageous that the power of the individual loads or glow plugs can be controlled.

BRIEF DESCRIPTION OF THE DRAWINGS

Two exemplary embodiments of the invention are shown in the drawing and explained in more detail in the description. In the drawing.

DESCRIPTION OF THE PREFERRED EMBODIMENTS OF THE INVENTION

In principle, the apparatus is suitable for driving and controlling any electrical loads. Particularly advantageous, however, is the use for driving and controlling glow plugs in motor vehicles having an automatically controlled internal combustion engine. An exemplary embodiment with four glow plugs is explained below.

Figure 1:
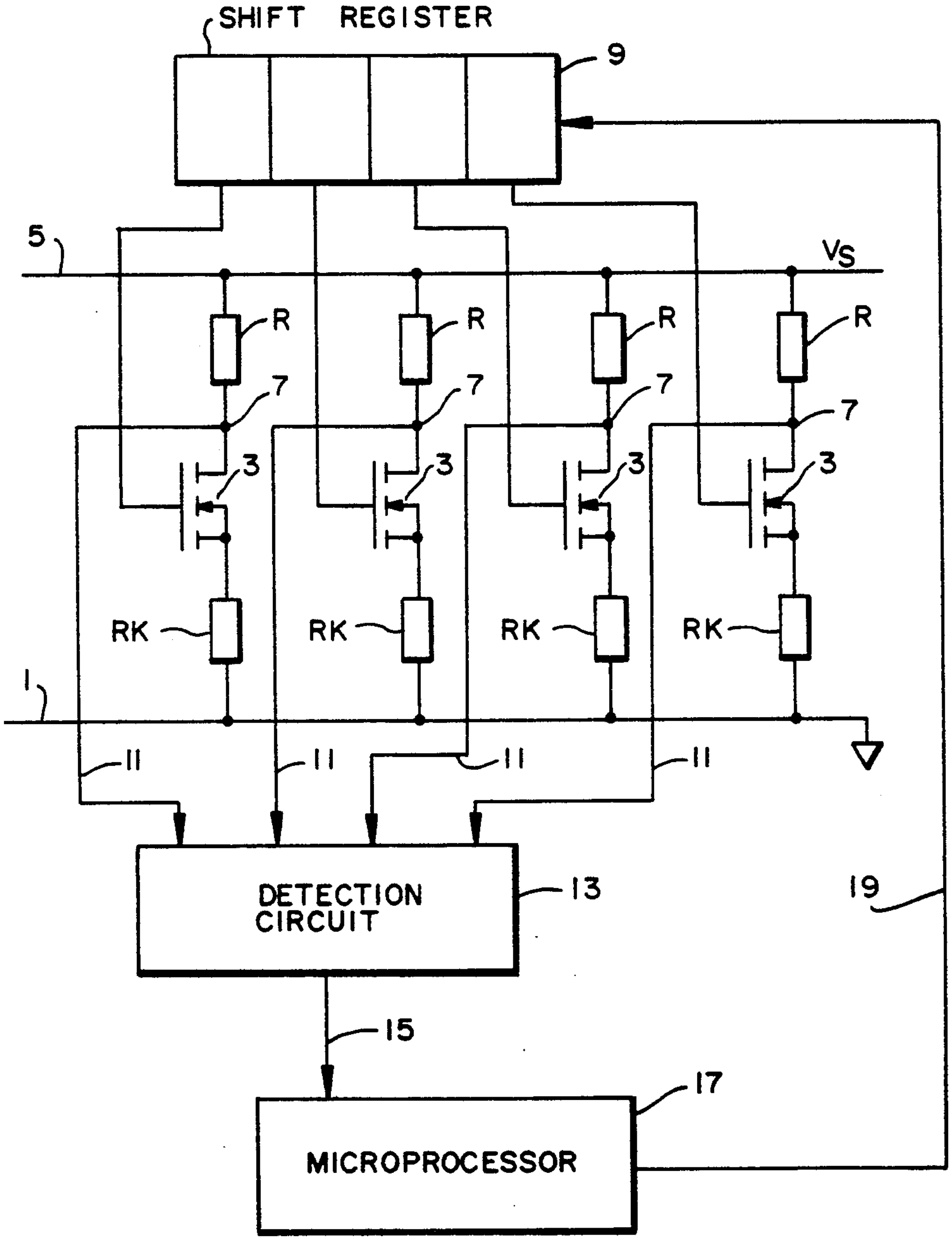
FIG. 1 is a schematic circuit diagram of the apparatus which includes a microprocessor having a sequential logic circuit configured as a shift register.

For simplicity, FIG. 1 only shows the internal resistances RK of the four glow plugs whose first end is connected to a first conductor 1 connected to ground. Their second end is connected to a semiconductor switch 3 which is connected via a shunt or resistor R, which acts as a measuring resistor, to a second conductor 5. The conductor 5 is connected to the voltage supply or the vehicle supply system, for example to terminal 15, to which a voltage of, for example, approximately 12 to 14 V is applied during operation.

In the present case n-channel enhancement MOSFETs have been selected as semiconductor switches. Other semiconductor power switches can also be used. Source S and substrate or bulk B of the FETs are connected to each other and are connected to the second end of the internal resistance RK of the glow plug which is situated opposite the ground connection. The drain electrode D of the FETs is connected to the node 7 at which the semiconductor switches are connected to the measuring resistor R. The gate electrode G is connected to a multistage sequential logic circuit which is shown here as a shift register 9. The subdivision of the shift register 9 into four sections indicates that each stage, that is, each flip-flop, of the shift register is assigned to an FET 3. A measuring line 11 is connected from the nodes 7 to a signal evaluation or an undercurrent/overcurrent detection circuit 13 which determines the potential present at the node 7 and compares it with the potential present on line 5 and/or on line 1 by means of undercurrent/overcurrent comparators. A signal line 15 is connected from the detection circuit 13 to a microprocessor 17. The microprocessor 17 is connected via a driving line 19 to the shift register 9.

Figure 2:
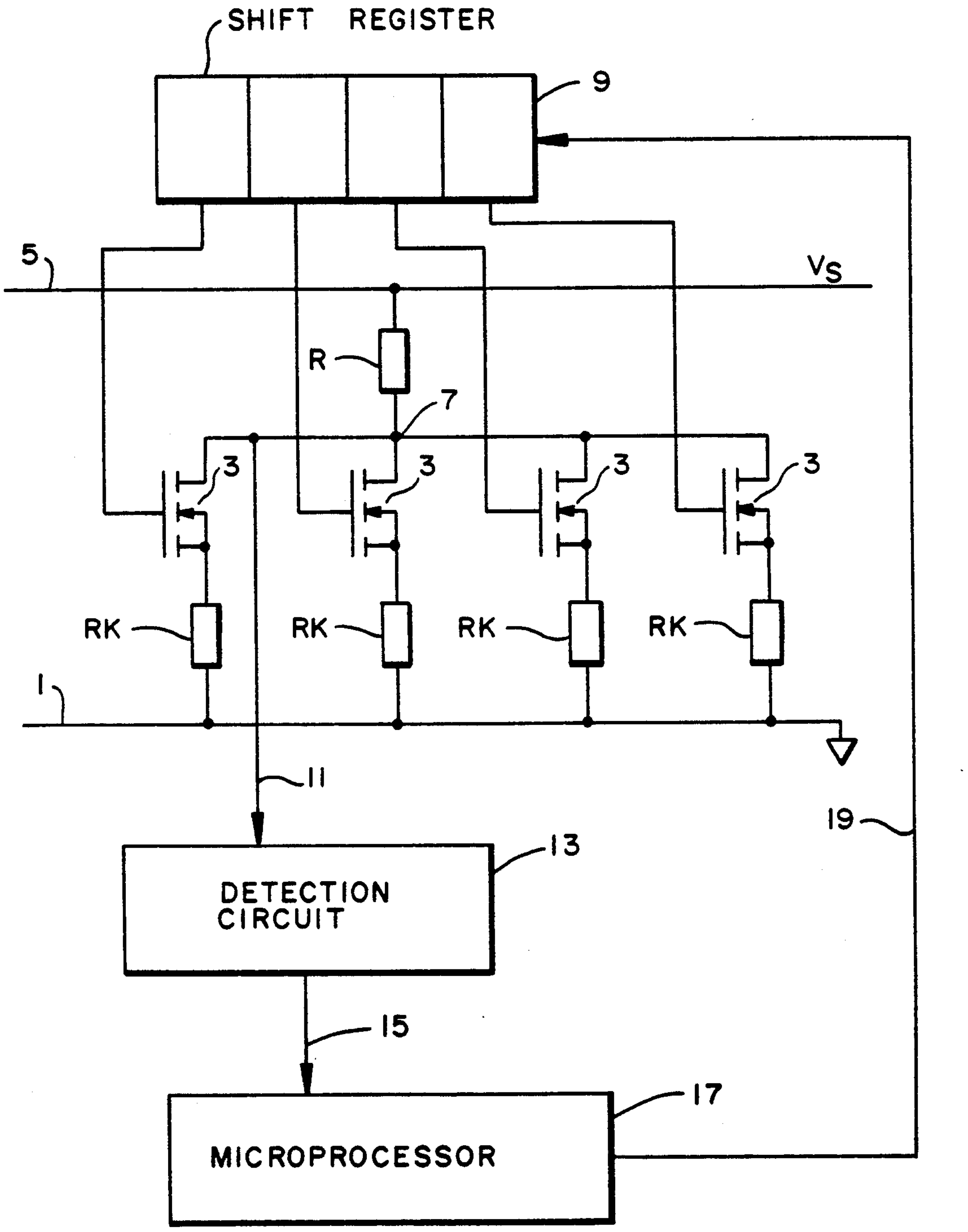
FIG. 2 is a schematic circuit diagram of the apparatus according to FIG. 1 having only one measuring resistor.

FIG. 2 shows a further exemplary embodiment of the apparatus. In FIGS. 1 and 2, corresponding elements are provided with identical reference symbols.

FIG. 2 shows series connections of glow plugs, of which only the internal resistance RK is shown for simplicity, and semiconductor switches which are configured as n-channel enhancement MOSFETs 3. The drain electrodes D of all the FETs 3 are connected to each other at the node 7. Between this node and the second conductor 5 there is, in this embodiment, only one shunt or resistor R serving as measuring resistor. Owing to the change in the circuit, only one connecting line 11 is connected to the undercurrent/overcurrent detection circuit 13.

Figure 3A:
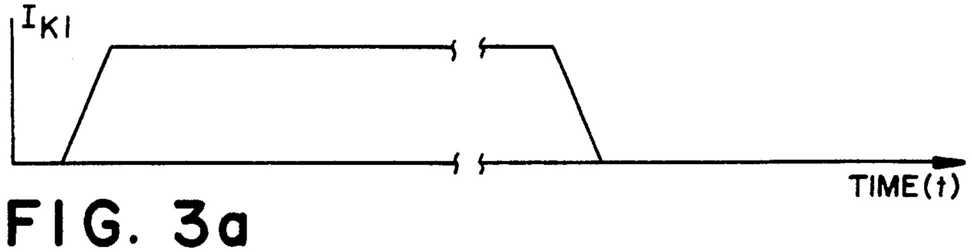
FIG. 3*b* shows a graph of the course of current for a second one of the glow plugs.
FIG. 3*c* shows a graph of the course of current for a third one of the glow plugs.
FIG. 3*d* shows a graph of the course of current for a fourth one of the glow plugs; and, FIG. 3*e* shows the course of the voltage $U_R$ across the resistor R of FIG. 2.
Figure 3B:
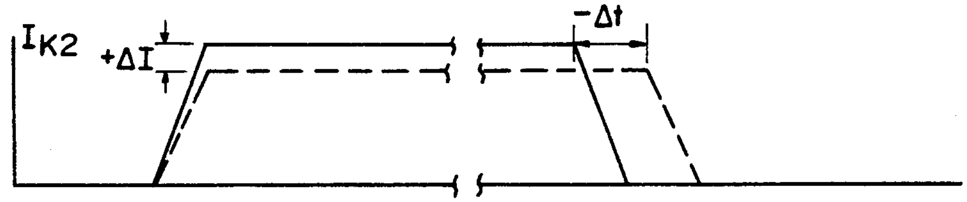
Figure 3C:
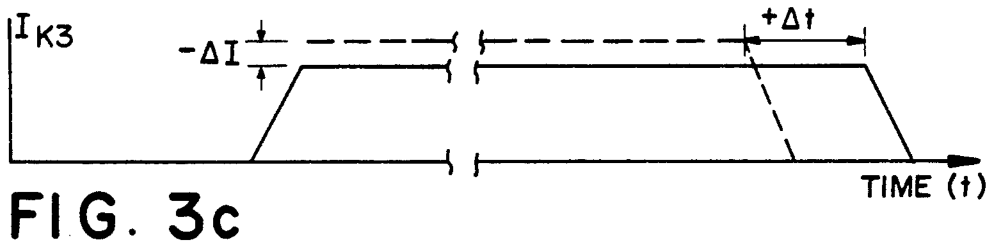
Figure 3D:
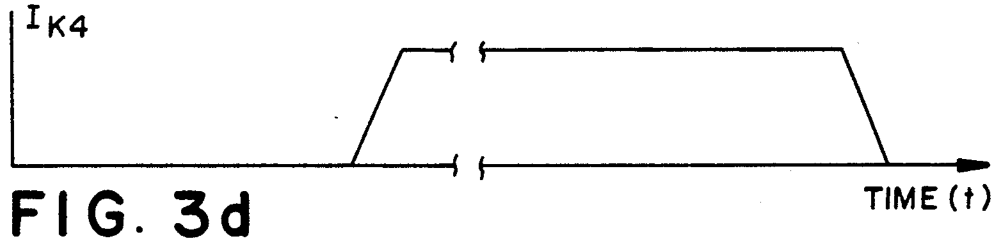
Figure 3E:
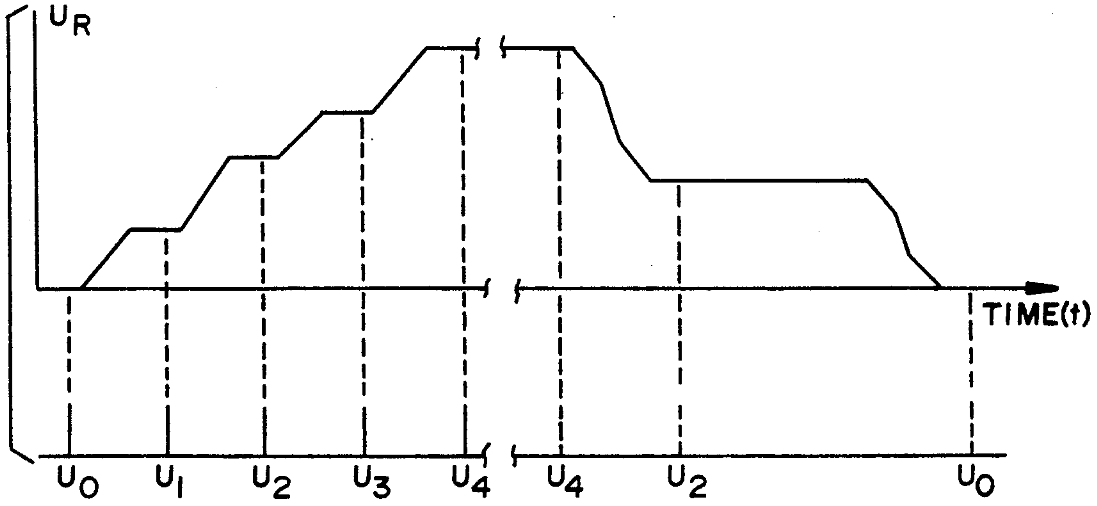

FIGS. 3*a* to 3*d* show in separate diagrams the time-dependent course of the currents $I_{K1}$ to $I_{K4}$ flowing through the four glow plugs. In addition, in FIG. 3*e*, the course of the voltage $U_R$ across the resistor R shown in FIG. 2 is shown. Finally, it is also shown at what point in time the voltage is measured across the shunt or resistor. The voltage measurement is not required while the glow plugs are being switched off. This is made clear by the dotted representation.

The operation of the apparatus is explained in more detail below with reference to the FIGS.

Figure 1A:
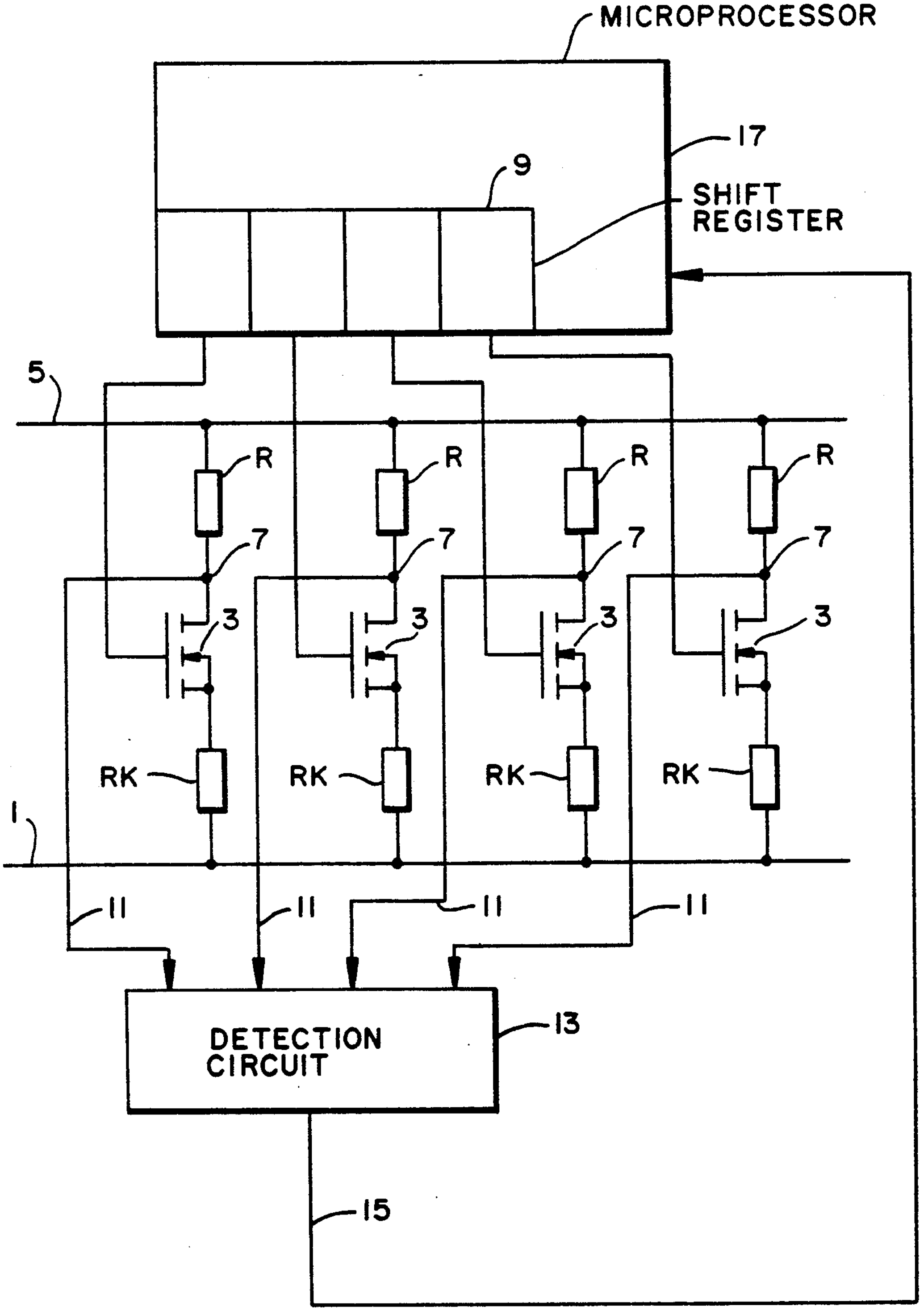
FIG. 1*a* is a schematic circuit diagram of the apparatus wherein the shift register is included within the microprocessor.
Figure 2A:
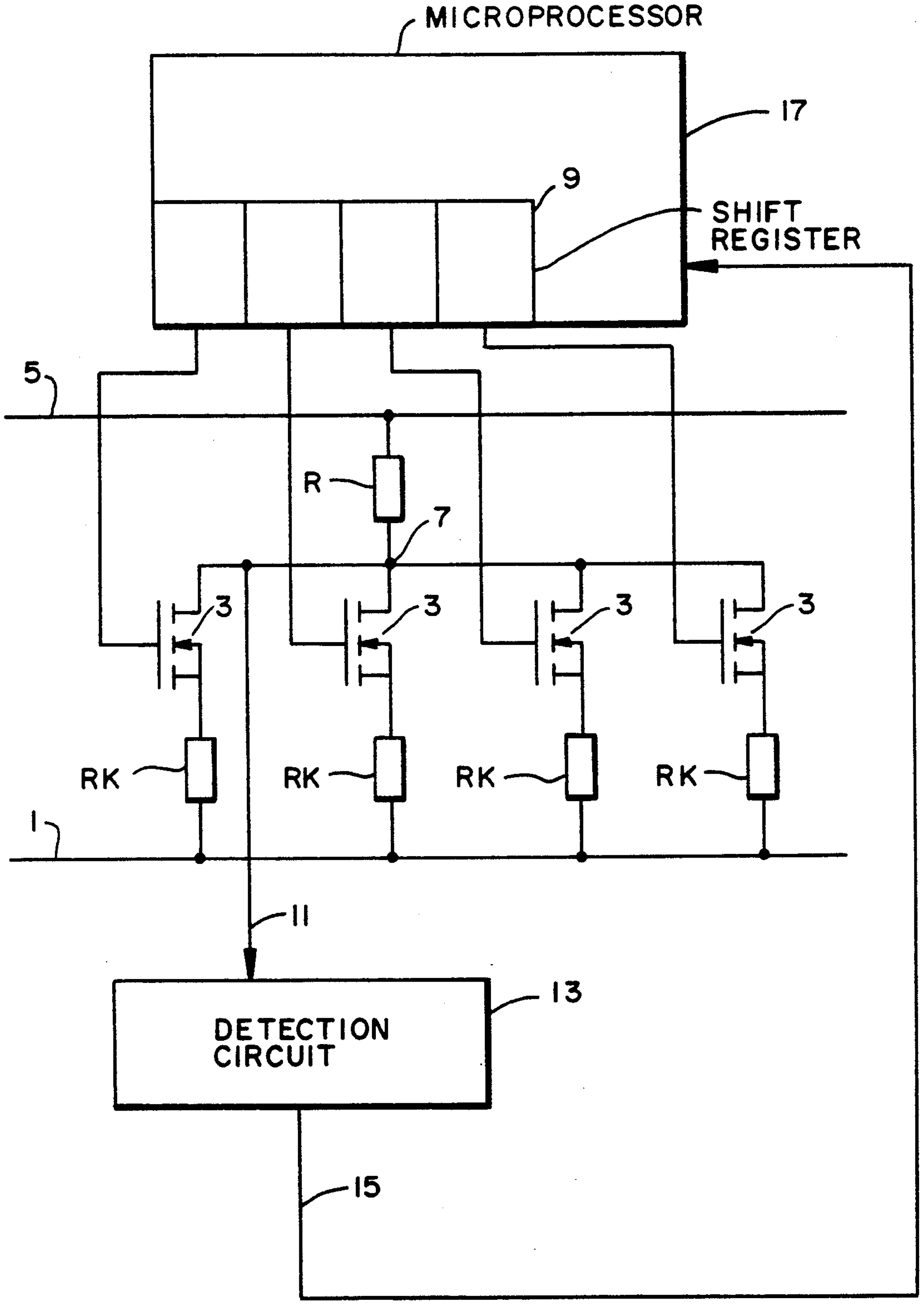
FIG. 2*a* is a schematic circuit diagram of an embodiment corresponding to the embodiment of FIG. 1*a* except that only one measuring resistor is provided and, FIG. 3*a* shows a graph of the course of current for a first one of the glow plugs.

During preheating, all the glow plugs are brought to a temperature of approximately 800° to 1000° C. For this purpose, the voltage supply, that is, the vehicle supply system has to deliver a high voltage. This causes the vehicle supply system voltage to drop considerably if all the glow plugs are driven at the same time. High-frequency interference voltages occur in the vehicle supply system during phase-displaced driving as described above. In the embodiments shown, the glow plugs are therefore driven by the microprocessor 17 with time displacement. This can be done by a suitable program stored in the microprocessor or by the microprocessor having a multistage sequential circuit which, in the present case, is configured as shift register 9 and shown in FIG. 1*a* . FIG. 2*a* corresponds to FIG. 1*a* but shows the apparatus thereof with only one measuring resistor.

Each stage of the shift register 9 is assigned to an FET 3 which serves as a semiconductor switch. That is to say, the gate G of the FETs 3 is driven by signals from the shift register 9 in such a manner that the FETs go over to the conducting state and thereby connect the glow plugs RK with the voltage-carrying conductor 5. The FETs 3 are driven in such a manner that the glow plugs are sequentially switched on so rapidly that, during switch-on, the current rise in one glow plug is still not entirely completed when the next glow plug is switched on.

In this way, a quasi-steadystate current rise is produced.

The process of switching off the glow plugs is controlled in a corresponding manner, that is, before the current decrease of a glow plug has decayed, the next one is switched off so that a virtually continuous current decrease is produced. This results in a "damped" switch-off operation.

The preheating operation is consequently initiated and terminated in such a manner that no high-frequency interference signals can be produced in the vehicle supply system.

Faults in the glow plugs, for example, a short circuit or open circuit, can be detected by measuring the plug currents. The four resistors R connected in series with the FETs 3 and the internal resistances RK of the plugs serve this purpose according to FIG. 1. The voltage drop across the resistors R is measured via the measuring lines 11 by the undercurrent/overcurrent detection circuit 13. This circuit evaluates the measured values preferably with undercurrent or overcurrent comparators designed as individual comparators and delivers a corresponding output signal via the signal line 15 to the microprocessor 17. The measuring lines 11 may also be connected to an OR-circuit whose output signal is conducted to the detection circuit 13. The OR-circuit may also be incorporated in the detection circuit 13.

FIG. 2 shows a simplification of the apparatus in which only a shunt or measuring resistor R is provided which is assigned to the parallel circuit of all the plugs with the FETs 3. This likewise reduces the number of measuring lines 11 to one. Correspondingly, only one comparator is provided in the detection circuit 13.

To detect open circuits, the plugs are switched on during vehicle operation in sequence without heating at any desired time interval for a very short time, preferably for 1 ms. The current flowing through the plugs is measured by measuring the voltage drop across the shunt or resistor R. At the same time, it is not necessary to sample the voltage drops across the resistors R individually in the detection circuit 13 and to feed them to the individual comparators configured as undercurrent comparators; an OR-logic operation of the signals is sufficient to determine whether a particular current threshold has been exceeded or not. Both the embodiments in FIGS. 1 and 2 are suitable for the undercurrent detection.

Because the plugs are driven by means of the microprocessor 17 via the control line 19, it is known which plug has just been driven. In this way, an open circuit, that is, an excessively low voltage or current value, can be assigned to a plug without an identification occurring from the OR-logic operation.

During vehicle operation without glowing it is also possible to detect the short-circuiting of a plug by measuring the voltage drop across the resistor R by means of individual comparators in the detection circuit 13 configured as overcurrent comparators. As in the case of undercurrent detection, the plugs are switched on sequentially at any desired time interval for a very short time, preferably 1 ms. Because of the known assignment of the driving with respect to time by the microprocessor 17, an OR-logic operation of the measuring signals is also sufficient in this case so that both exemplary embodiments can be used for overcurrent detection. However, a higher current threshold should be chosen in this case than for the undercurrent detection.

The short-circuiting of plugs can also be detected during preheating while the plugs are being switched on sequentially with time displacement. Owing to the assignment of the switch-on process with respect to time, the defective plug can be identified if an overcurrent occurs.

If short-circuiting of a plug only occurs when all the plugs have been switched on, an overcurrent or a short circuit can only be assigned to a particular plug if an individual shunt is assigned to all the plugs according to FIG. 1.

If the measuring lines 11 in FIG. 1 are interconnected by an OR-element, the detection circuit 13 cannot detect which of the plugs is short-circuited. In this case, all the plugs are first switched off and in a time-displaced switch-on process, a determination is then made as to which of the plugs is defective.

In the circuit according to FIG. 2, it is at first not possible to determine which of the plugs is defective if the fault occurs after all the plugs have been switched on.

Here, too, all the plugs are first switched off if an overcurrent occurs and then the plugs are driven at any desired time interval with pulses of preferably 1 ms duration with only one FET 3 being brought to the conducting state in each case. Since it is known which branch has just been energized when an overcurrent occurs, the defective plug can be identified.

In the embodiment of FIG. 1, instead of the resistor R which serves as measuring resistor, the bulk resistance of the semiconductor switch can also be used to measure the current flowing through the glow plugs. In that case, the potential present at the source electrode S has to be measured. Any other desired current measuring method can, however, also be used, for example, also Hall sensors.

The fault detection and identification of a defective plug can be combined with a visual and/or acoustic fault indication.

Defective plugs can be switched off selectively if a freely settable sequential circuit is used. In this way, interference in the vehicle supply system can be avoided without it being necessary to shut off the engine immediately.

The apparatus according to FIGS. 1 and 2 are also suitable for reducing interference voltages. In motor vehicles high-energy interference voltages, for example, so-called load-dump pulses may occur which assume a voltage of up to 120 V over several hundred milliseconds for an internal resistance of 0.5 to 4 Ω. To suppress such pulses, which may result in the destruction of electronic control equipment, protective Zener diodes have been used up to now which convert the energy of the interference signal source into heat. Large and expensive diodes are necessary for this purpose.

The energy of these interference signals can also be reduced or converted into heat with suitable driving via the glow plugs.

For this purpose, the microprocessor 17 determines in any desired way whether a fairly high interference voltage of, for example, 50 V and over is present. If this is the case, one or more glow plugs are switched on simultaneously by a control signal delivered via the drive line 19, for example after 1 ms, preferably for 200 to 300 ms, to ensure the reduction of the dangerous energy. The parallel-connected glow plugs have a total resistance of approximately 100 mΩ, so that the interference source is so heavily loaded that the interference voltage drops to a value which is safe for electronic control equipment.

In this way, interference voltages can only occur for approximately 1 ms before the microprocessor 17 responds. These voltages can be reduced with substantially smaller and less expensive protective Zener diodes.

The driving apparatus explained in more detail with reference to the figures can also be used, as is evident from FIG. 3, to control the power delivered by the glow plugs. When the glow plugs are switched on sequentially, the voltage dropping across the shunt or resistor R (compare with FIG. 2) common to all the plugs is measured. The sequential driving of the plugs can be seen in FIG. 3 from the variation with time of the currents $I_{K1}$ to $I_{K4}$ assigned to the individual plugs. Since a common shunt is assigned to all the plugs, the voltage $U_R$ dropping across this resistor R, whose variation with time is also shown in FIG. 3, is proportional to the total current. According to FIG. 3, the measurement of the voltage is shown in a separate diagram.

The instantaneous electrical power associated with each individual plug is calculated with the aid of the microprocessor 17 from the voltage changes corresponding to the particular plug current and from the instantaneous operating voltage.

A predetermined mean power can be set on the basis of this calculation for each individual plug. This takes place because the switch-on time can be lengthened or shortened by Δt. In FIG. 3, the switch-on time of $I_{K2}$ is shortened and that of $I_{K3}$ is lengthened. In this way, variations in the tolerances of the plugs, which may lead to the current level varying by ΔI, can be compensated for, as can the variations in the vehicle supply system voltage and different cylinder performance.

Finally, it should further be pointed out that the driving apparatus described can also be used for controlling the temperature of the glow plugs. For this purpose, for example, temperature-dependent resistors whose measurement signals are fed to the microprocessor 17 are assigned to the glow plugs. The microprocessor 17 then drives the glow plugs with short switch-on pulses approximately 1 s long in order to maintain the desired temperature.

We claim:

1. A method of driving and testing at least two glow plugs of a diesel engine which are each switchable by a semiconductor switch connected in series with a measuring resistor and drivable by a microprocessor, the method comprising the steps of:

detecting respective currents flowing through the glow plugs by measuring the voltage drop across the measuring resistor;

driving the semiconductor switches in a time displaced manner one after the other so that the sum of the currents flowing through all of said glow plugs provides a quasi-steady current rise as the switches are driven into their conductive state; and, determining the presence of an open circuit or a short circuit from the detected currents.

2. The method of claim 1, wherein an instantaneous electrical energy of the individual glow plugs is determined and the switched-on duration of each of the glow plugs is individually shortened or lengthened for adjusting a predetermined power of the glow plugs.

3. The method of claim 1, wherein a switching device is provided for driving respective ones of said semiconductor switches and an electrical supply is provided for the glow plugs, the microprocessor and the switching device and a plurality of the semiconductor switches are driven simultaneously when an energy-rich overvoltage is detected in one of the following: the electrical supply of the glow plugs, the electrical supply of the microprocessor and/or the electrical supply of the switching device.

4. The method of claim 1, wherein if the presence of an open circuit or a short circuit was detected after all glow plugs have been driven, switching off all of the glow plugs; and thereafter, again switching on the glow plugs in time displacement one with respect to the other for determining the defective glow plug.

5. The method of claim 1, wherein said step of driving the semiconductor switches comprises driving the glow plugs on sequentially at any desired time displacement one from the other for a very short time duration whereafter said step of detecting respective currents flowing through the glow plugs is performed by measuring the voltage drop across the measuring resistor for the purpose of detecting an open circuit and/or a short circuit in one of the glow plugs.

6. The method of claim 5, said short time being preferably one millisecond.

7. An apparatus for driving and testing at least two glow plugs of a diesel engine, the apparatus comprising:

a voltage supply;

a plurality of semiconductor switches for switching on and off corresponding ones of the glow plugs;

measuring resistor means connected in series with said voltage supply and said glow plugs;

a microprocessor for driving said semiconductor switches in a time displaced manner one after the other;

detection means for detecting a voltage across said measuring resistor means to detect currents flowing through said glow plugs wherein the currents are utilized for detecting the presence of an open circuit or a short circuit; and, said microprocessor including means electrically connected to said switches for driving said switches in a time displaced manner so as to cause the sum of the currents flowing through all of said glow plugs to provide a quasi-steadystate current rise as said switches are driven into their conductive state.

8. An apparatus for driving and testing at least two glow plugs of a diesel engine, the apparatus comprising:

a voltage supply;

a plurality of semiconductor switches for switching on and off corresponding ones of the glow plugs;

measuring resistor means connected in series with said voltage supply and said glow plugs;

a microprocessor for driving said semiconductor switches in a time displaced manner one after the other;

detection means for detecting a voltage across said measuring resistor means to detect currents flowing through said glow plugs wherein the currents are utilized for detecting the presence of an open circuit or a short circuit; and, said microprocessor including means for determining an instantaneous electrical energy of an individual glow plug from said detected currents and for individually shortening or lengthening the switched-on duration of each of the glow plugs for adjusting a predetermined power of the glow plugs.

9. An apparatus for driving and testing at least two glow plugs of a diesel engine, the apparatus comprising:

a voltage supply;

a plurality of semiconductor switches for switching on and off corresponding ones of the glow plugs;

measuring resistor means connected in series with said voltage supply and said glow plugs;

a microprocessor for driving said semiconductor switches in a time displaced manner one after the other;

detection means for detecting a voltage across said measuring resistor means to detect currents flowing through said glow plugs wherein the currents are utilized for detecting the presence of an open circuit or a short circuit;

said microprocessor including an electronic, multistage switching circuit for driving said semiconductor switches; and, said multistage switching circuit being a shift register.

10. The apparatus of claim 9, said shift register including a plurality of flip-flops corresponding to respective ones of said glow plugs and said glow plugs being connected to corresponding ones of said flip-flops via respective ones of said semiconductor switches.

11. The apparatus of claim 10, said shift register being provided for driving said semiconductor switches and being realized by a program stored in said microprocessor.

* * * * *